(12) United States Patent
Katahira

(10) Patent No.: US 7,027,168 B2
(45) Date of Patent: Apr. 11, 2006

(54) IMAGE FORMING DEVICE

(75) Inventor: Shunsuke Katahira, Hachioji (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 940 days.

(21) Appl. No.: 09/909,860

(22) Filed: Jul. 23, 2001

(65) Prior Publication Data

US 2003/0016377 A1    Jan. 23, 2003

(51) Int. Cl.
*G06F 15/00* (2006.01)
*G03G 21/02* (2006.01)

(52) U.S. Cl. .......................................... 358/1.1; 399/79

(58) Field of Classification Search ................ 358/1.1, 358/1.13, 1.16; 399/82, 403, 79, 19, 370; 271/145, 188; 369/84
See application file for complete search history.

(56) References Cited

U.S. PATENT DOCUMENTS 6,260,837 B1 *   7/2001   Nanba et al. ............ 270/58.08

6,347,203 B1 *   2/2002   Kutsuwada .................. 399/82

FOREIGN PATENT DOCUMENTS

| JP | 08046191 | 2/1994 |
| JP | 10157921 | 6/1998 |

* cited by examiner

*Primary Examiner*—Kimberly Williams
*Assistant Examiner*—Saeid Ebrahimi-dehKordy
(74) *Attorney, Agent, or Firm*—Foley & Lardner LLP

(57) ABSTRACT

A complex-type image forming device operative for a first function (copy function) and a second function (printer function or facsimile function) is reduced in waiting time for a user to use it for the copy function. More specifically, the image forming device comprises: an image forming main body operative in at least two different functions including a first function and a second function, a first output (copy output) having an image formed by said first function and a second output having an image formed by said second function being discharged from a same paper outlet; and a finisher including a first bin for receiving the first output (copy output) and a printer bin for receiving the second output, which are selectively set in the position at the paper outlet such that, when the second bin is in the position at the paper outlet, if an original to be copied is set, or if an automatic original feeder or a platen is raised, the second bin is replaced by the first bin.

15 Claims, 4 Drawing Sheets

IMAGE FORMING DEVICE

BACKGROUND OF THE INVENTION

1. Field of the Invention

This invention relates to an image forming device.

2. Related Background Art

A complex-type image forming device (complex device) having functions as printer and facsimile machine in addition to the function as copy machine has recently been put to practical use. The complex machine has advantages from the viewpoints of space saving, cost reduction, and so on. In a complex machine of this type, its finisher normally has two or more bins. For example, the first-stage bin is the copy bin for receiving a copy output of an image made by the copy function whereas the second-stage bin is the printer bin for receiving a printer output of an image made by the printer function, and it is selectively used between the copy function and the printer function. Thereby, copy outputs are assorted to the first bin and printer outputs are assorted to the second bin to keep them unmixed. When printer outputs are discharged from the machine, for example, the user often stays apart from the image forming device, and the printer outputs are often left unremoved for a while. However, since these two bins are separately prepared, printer outputs do not mix up with copy outputs.

The Inventor, however, has been recognizing that the waiting time is too long with the complex machine of this type.

For example, in case of a complex machine configured to function in two different modes, namely, copy function and printer function, the printer bin normally remains in the position at the paper outlet for a predetermined time after completion of printing. Therefore, it is the printer bin that is set in the position at the paper outlet immediately after printing. Thus, for the copy function with the conventional image forming device, it starts switching the bin to the copy bin when a user depresses the copy key. This means that the user has to wait for a considerable period of time after he or she depresses the copy key for the purpose of copying something immediately after printing until the copy bin is set to the position in place of the printer bin.

BRIEF SUMMARY OF THE INVENTION

The invention has been made under the circumstances, and it is an object of the invention to provide a complex-type image forming device that reduces the waiting time for the bins to be switched.

According to embodiments of the present invention, there is provided an image forming device comprising:

an image forming main body operative for at least two different functions including a copy function and a printer function, a copy output having an image copied by said copy function and a printer output having an image printed by said printer function being discharged from a same paper outlet; and a finisher including a copy bin for receiving said copy output and a printer bin for receiving said printer output, which are selectively set in a position at said paper outlet such that, when said printer bin is in the position at said paper outlet, if an original to be copied is set, or if an automatic original feeder or a platen is raised, said printer bin is replaced by said copy bin.

According to embodiments of the present invention, there is further provided an image forming device comprising:

an image forming main body operative for at least two different functions including a copy function and a facsimile function, a copy output having an image copied by said copy function and a facsimile output having an image formed by said facsimile function being discharged from a same paper outlet; and a finisher including a copy bin for receiving said copy output and a facsimile bin for receiving said facsimile output, which are selectively set in a position at said paper outlet such that, when said facsimile bin is in the position at said paper outlet, if an original to be copied is set, or if an automatic original feeder or a platen is raised, said facsimile bin is replaced by said copy bin.

According to embodiments of the present invention, there is further provided an image forming device comprising:

an image forming main body operative for at least two different functions including a first function and a second function, a first output having an image formed by said first function and a second output having an image formed by said second function being discharged from a same paper outlet; and a finisher including a first bin for receiving said first output and a second bin for receiving said second output, which are selectively set in a position at said paper outlet such that, when said second bin is in the position at said paper outlet, if an original to be copied is set, or if an automatic original feeder or a platen is raised, said second bin is replaced by said first bin.

DETAILED DESCRIPTION OF THE INVENTION (First Embodiment)

Figure 1:
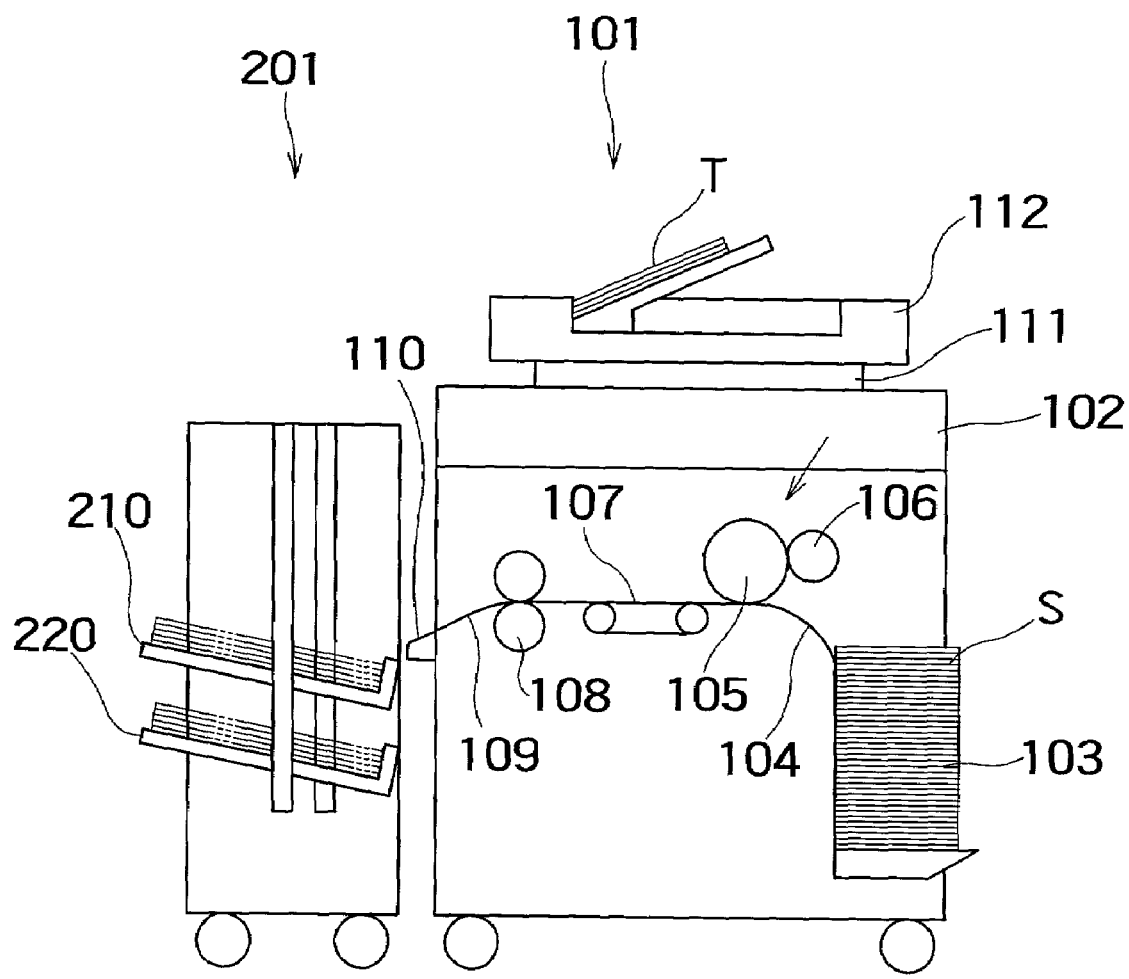
FIG. 1 is a diagram that shows an image forming device according to the first embodiment of the invention.

FIG. 1 is a schematic diagram that shows an image forming device taken as the first embodiment of the invention. The machine of FIG. 1 is a complex-type machine operative for two different functions, namely, copy function and printer function. The machine of FIG. 1 includes an image forming main body 101 and a finisher 201. As shown in FIG. 1, a copy bin 210 of the finisher 201 is normally set in the position in communication with a paper outlet of the image forming main body. For the copy function, an original T to be printed is set on an automatic original feeder 112. The automatic original feeder 112 includes an original sensor that detects the size of the original T, and the sheet size is decided based on the information from the original sensor. The original sensor is one of sensors conventionally used for this purpose. Once a user depresses the copy key, the original T to be copied is sent onto an original-setting glass plate 111 by the automatic original feeder 112. A scanner 102 reads the original T to be copied with an optical system thereof, and forms a latent image on a photoreceptor 105. Toner from a development roller 106 adheres on the photoreceptor 105 and forms a visible image. The visible image is transferred to the sheet S transported from a deck 103 through a transport path 104. The sheet S is transported to a heat roller 108 by a transfer belt 107, and the toner is fixed onto the sheet S by the heat roller 108 heated to 200° C. through 300° C. The sheet S having the fixed toner is discharged from the paper outlet 110 via a transport path 109. The discharged sheet S is received by the copy bin 210 of the finisher 201.

Upon printing by the image forming device of FIG. 1, a signal instructing execution of printing is first sent to the optical system of the scanner 102, and the bin of the finisher 201 is switched from the copy bin 210 to the printer bin 220. Subsequently, the optical system of the scanner 102 forms a latent image on the photoreceptor 105. Then, in the same manner as the copy function, the photoreceptor 105 here again forms an image on a sheet S supplied from the deck 103. Thereafter, the sheet S having the image as a result of the printer function is received in the printer bin 220 of the finisher 201.

Figure 2:
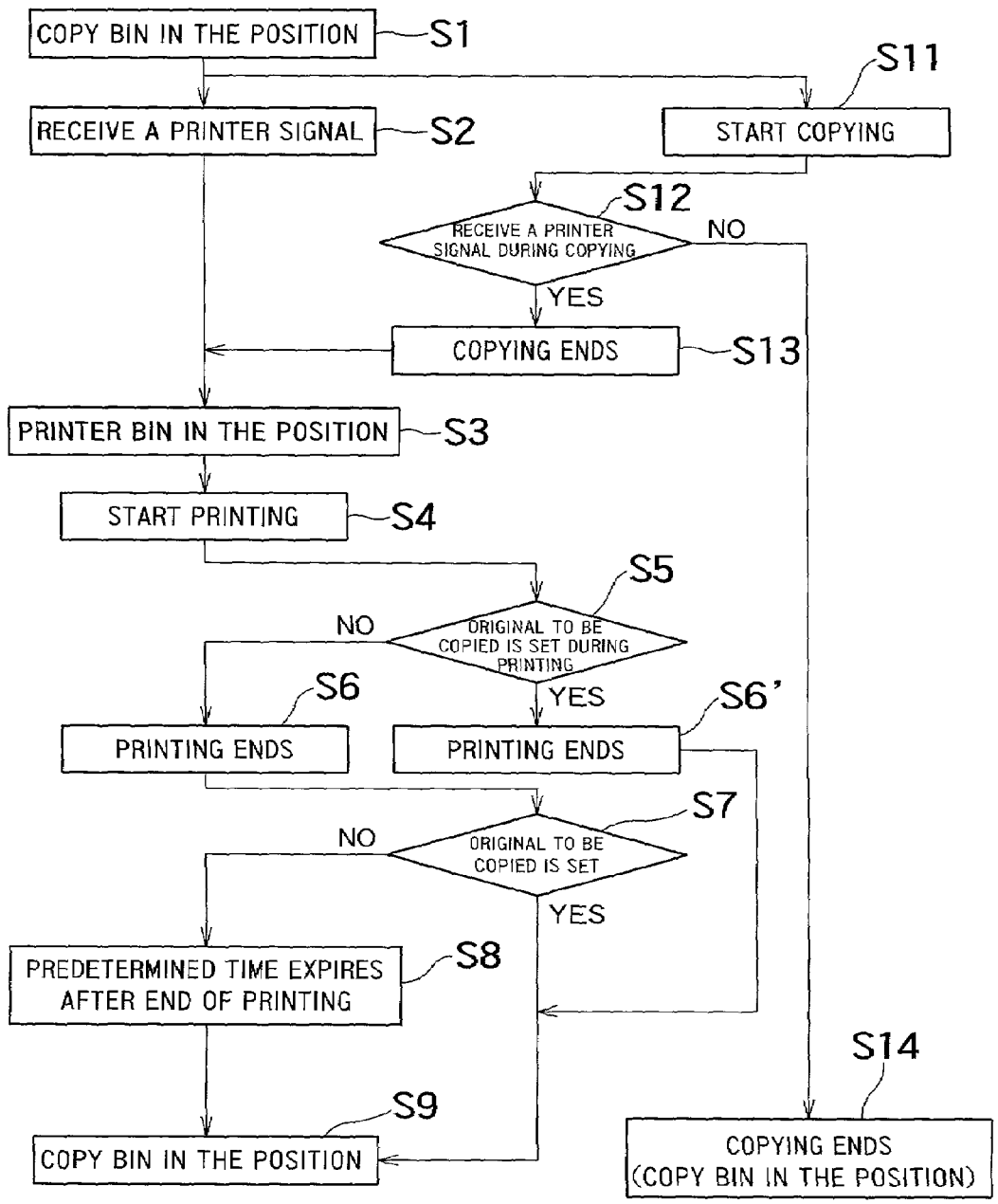
FIG. 2 is a flowchart that shows behaviors of the image forming device according to the first embodiment of the invention.

In this manner, the image forming device of FIG. 1 has the copy bin 210 for receiving a sheet S having an image made by the copy function and the printer bin 220 for receiving a sheet S having an image made by the printer function, and these bins are selectively set in the position in communication with the paper outlet 110. The image forming device of FIG. 1 is configured to set the copy bin 210 in the position continuous from the paper outlet 110 in the basic condition of the machine and to reset the copy bin 210 in the position a predetermined period of time later after an image is formed by the printer function. This set-up is especially convenient in case the image forming device is used more often for the copy function. One of features of the image forming device of FIG. 1 lies in reducing the waiting time for the changeover of the bins. Functions of the image forming device of FIG. 1 will be explained below with reference to the flowchart of FIG. 2.

As already mentioned, the copy bin 210 is in the position in the basic condition of the machine (S1). When the image forming main body 101 receives a printer signal for execution of printing (S2), the printer bin 220 is brought to the position (S3) at the paper outlet, and the printing is started (S4). Unless an original T to be printed is set during the printer function (S5), the machine executes predetermined procedures and completes the printing (S6). Printing is often repeated several consecutive times. Therefore, the printer bin 220 is maintained in that position for a predetermined period of time even after completion of each printing (S6). If the predetermined time passes before an original T to be copied is set (S7) after printing (S6), the copy bin 210 automatically returns to the position at the paper outlet (S9). Then, if an original T to be copied is set (S5) in the period between the start of printing (S4) and the end of printing (S6), printing is continued until it is completed (S6'), and immediately after completion of the printing (S6'), the copy bin 210 again returns to the position (S9). In this case, if the copy key is depressed before completion of the printing (S6'), the copy function is automatically started after the copy bin 210 returns to the position (S9).

One of features of the machine of FIG. 1 lies in that the bin immediately changes to the copy bin 210 (S9) when an original T to be copied is set (S7) within a predetermined period of time (S8) after completion of printing (S6). In contrast, in the conventional image forming device, in case a user copies something within a predetermined period of time (S8) after completion of printing (S6), the bin does not change until the user depresses the copy key.

On the other hand, in case the copy bin is in the position (S1), the copy function can be started (S11) immediately. After the copy function is started (S11), unless a printer signal is received during the copying (S12), predetermined procedures are executed, and the copying is completed (S14). In this case, the copy bin 210 is maintained in the position. If a printer signal is received during the copy function (S12), the printer bin 220 immediately moves to the position (S3) after completion of the copying (S13), and the printer function is started (S4).

In the image forming device of FIG. 1 explained above, once the original T to be copied is set on the automatic original feeder 112 (S7) for the copy function after completion of printing (S6), the copy bin 210 immediately returns to the position (S9). Therefore, at the moment when a user depresses the copy key after designating the number of copies to be made and the sheet S of a desired size, the copy bin 210 is already located in the position at the paper output 110. As a result, with the machine of FIG. 1, the user need not wait for the printer bin 220 replaced by the copy bin 210. Thus the complex-type image forming device of FIG. 1 can reduce the waiting time for copying.

In contrast, in the conventional image forming device, in case a user copied something within a predetermined period of time (S8) after completion of printing (S6), the waiting time for copying was long since the bin did not change before a user depressed the copy key. Ordinary engineers, however, took such operations of the conventional image forming device for granted probably because the machine was configured to permit copying conditions to be set only after setting an original when a user wanted to use the machine for a copy. That is, when the machine is used for the copy function, the original sensor first detects the size of the original T, and the machine determines the size of the sheet S for the copy, magnification of the copy, number of copies, and other conditions, based on the detected size of the original T. Therefore, for the copy function, copying conditions cannot be set before setting the original. Conditions for the copy function are determined upon depression of the copy key. Because of these facts, in case of using the machine for the copy function, engineers considered it reasonable to start movement of the bins upon depression of the copy key and not upon setting the original. The Inventors, however, remarked that the complex machine was defective in having a long waiting time, and has got the knowledge that the problem would be overcome by so configuring the bins that the copy bin 210 (S9) is immediately set in the position after an original T was set on the original-setting glass plate 110 (S7) to activate the copy function.

In addition, since the image forming device of FIG. 1, since the image forming device uses the original sensor, having been used conventionally, to detect the original T to be copied and to change the bins 210, 220, the machine need not use any additional sensor for detecting the original T to be copied, and its cost does not increase.

The image forming device of FIG. 1 has been explained as setting the original T to be copied on the automatic original feeder 112; however, the same operation will be ensured by rotating up the automatic original feeder 112 and setting the original T to be copied on the original-setting glass plate 111. Here again, since the existence of the original can be detected by using the original sensor for detecting the size of the original set on the original-setting glass late 111, the machine needs no additional sensor for detecting the original.

Furthermore, the image forming device of FIG. 1 has been explained as changing the position of bin of the finisher when the original T to be copied is set; however, the machine can be configured to change the position of the finisher's bin when the automatic original feeder or the platen is raised.

(Second Embodiment)

The image forming device according to the second embodiment is a complex-type machine operative for two different functions, namely, copy function and facsimile function. The entire configuration of the image forming device according to the second embodiment is approximately the same as that of the first embodiment (FIG. 1), so its detailed explanation is omitted. In the image forming device according to the second embodiment, the finisher 201 includes a copy bin 210 and a facsimile bin 220.

Figure 3:
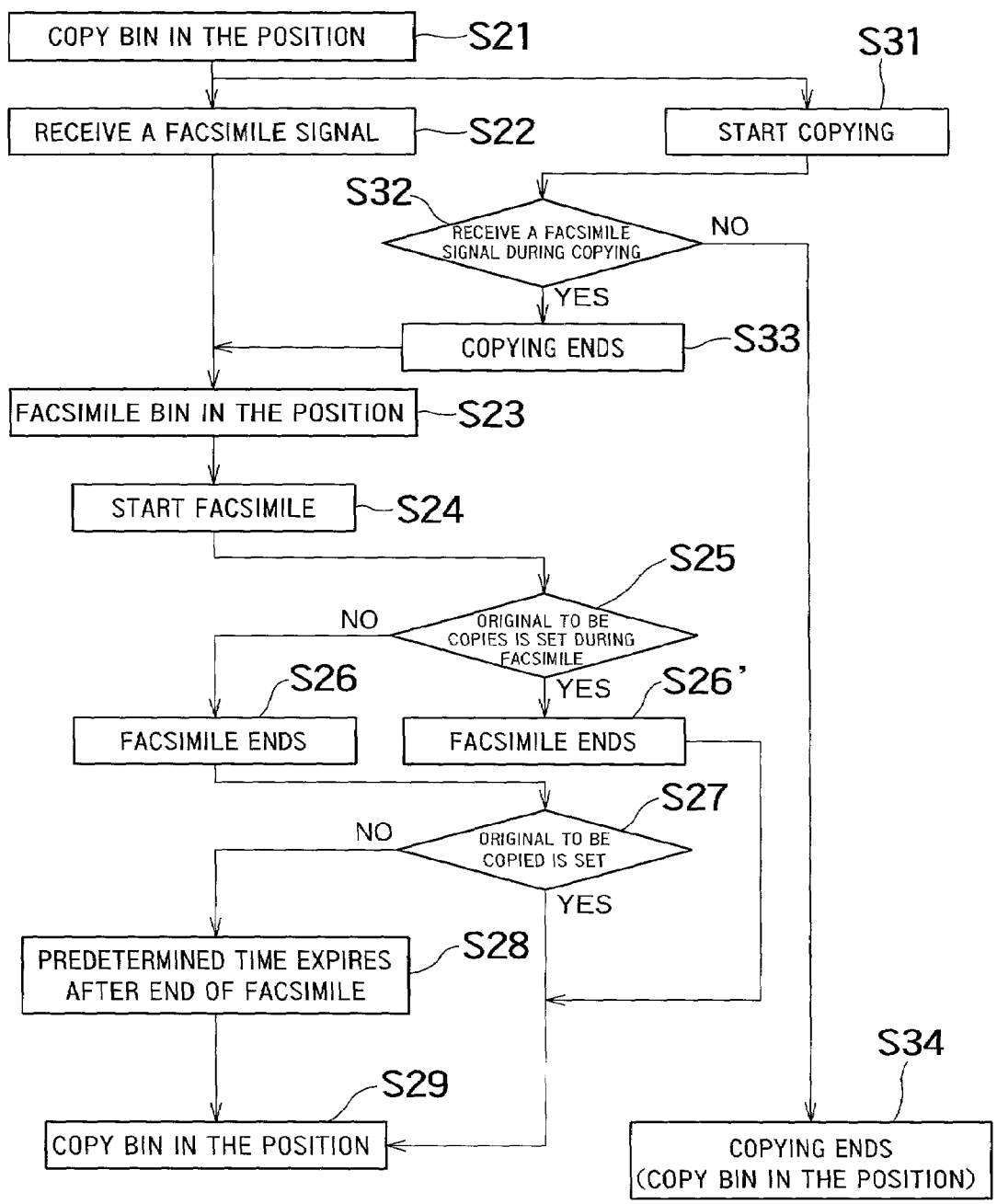
FIG. 3 is a flowchart that shows behaviors of an image forming device according to the second embodiment of the invention.

Behaviors of the image forming device according to the second embodiment are shown in the flowchart of FIG. 3. Similarly to the image forming device according to the first embodiment (FIG. 1), also during operations of the image forming device shown here, the facsimile bin is maintained in the position (S28) for a predetermined time after completion of a facsimile function (S26). Then, similarly to the first embodiment (FIG. 2), even before expiration of the predetermined time (S28) after completion of a facsimile function (S26), when an original T to be copied is set on the automatic original feeder 112 to make a copy, the copy bin 210 immediately returns to the position (S29). Therefore, also with the machine of FIG. 3, a user need not wait until the facsimile bin 220 is replaced by the copy bin 210.

In this manner, also in the complex-type image forming device shown here, which is operative for two different functions, namely, copy function and facsimile function, the waiting time before copying can be shortened similarly to the first embodiment.

In the embodiment shown here, the image forming device has been explained as being operative for two different functions: copy function and facsimile function, the invention can be similarly embodied in form of an image forming device operative for three different functions, namely, copy function, facsimile function and printer function.

(Third Embodiment)

A difference of the image forming device according to the third embodiment from the image forming device according to the first embodiment (FIG. 1) lies in that the finisher 201 holds the printer bin 220 at the position in its basic status. In the image forming device according to the third embodiment, when a predetermined period of time passes after completion of copying, the printer bin 220 returns to the position. The other main configuration is substantially the same as the first embodiment (FIG. 1), so its detailed explanation is omitted.

Figure 4:
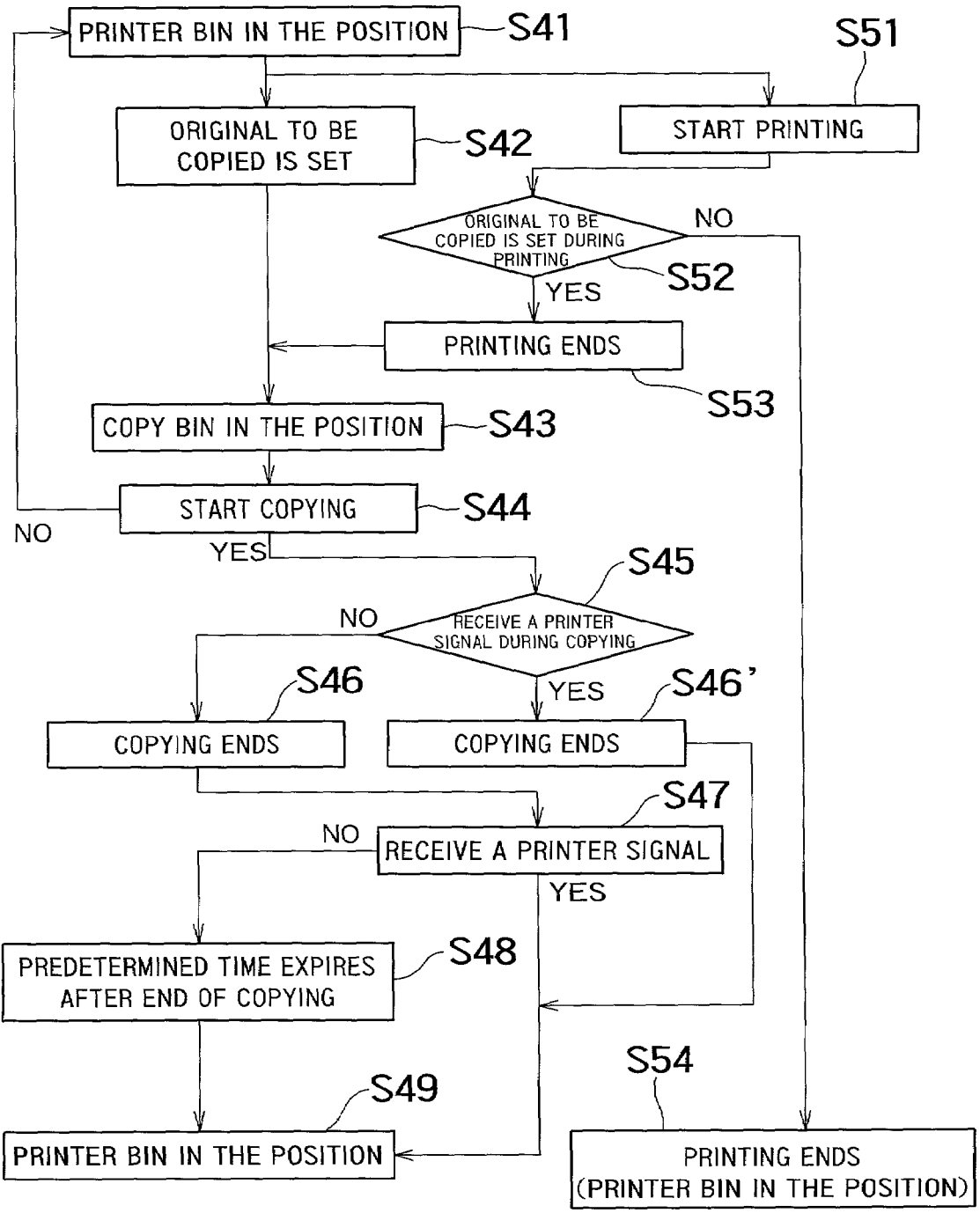
FIG. 4 is a flowchart that shows behaviors of an image forming device according to the third embodiment of the invention.

FIG. 4 shows a flowchart of behaviors of the image forming device according to the third embodiment. As explained above, the printer bin 220 is in the position in the basic status of the machine (S41). One of features of the image forming device shown here lies in that the bin is immediately changed to the copy bin 210 (S43) when an original T to be copied is set on the automatic original feeder 112 of the image forming main body 101 of the image forming device to make a copy of the original T (S42). As a result, at the point of time when a user selects the number of copies and the size of the sheet S, the bin is already changed to the copy bin 210 (S43), and copying is immediately started when the copy key is depressed (S44). Note here that the bin is automatically reset to the printer bin 220 (S41) if the copy function is not started within a predetermined time (S44) after the original T to be copied is set on the automatic original feeder (S42) for making a copy thereof. Thereafter, if no printer signal is received during copying (S45), then the copying ends (S46) after predetermined procedures. After copying is conducted, the copy function is often repeated. Taking it into consideration, the embodiment shown here maintains the copy bin 210 in the position for a predetermined period of time after completion of the preceding copying (S46). If a predetermined time expires (S48) without receiving a printer signal (S47) after completion of the copying (S46), the printer bin 220 automatically returns to the position (S49). In contrast, if a printer signal is received (S45) within the period after the start of copying (S44) to the end of the copying (S46), the copy function is continued until the copying ends (S46'), and after the copying ends (S46'), the printer bin 220 immediately returns to the position to start the printer function. If a printer signal is received (S47) within a predetermined time (S48) after completion of the copy function (S46), then the printer bin 220 immediately returns to the position (S49) to commence the printer function.

On the other hand, when the printer bin is in the position (S41), the printer function can be started instantly (S51). If an original T to be copied is not set (S52) during the printer function after the printer function is started (S51), predetermined procedures are taken, and the printing ends (S54). In this case, the printer bin 210 is held in the position. If an original T to be copied is set (S52) during the printer function, the bin is immediately changed to the copy bin 210 (S43) after completion of the printer function (S53) to commence the copy function (S44).

In the image forming device according to the instant embodiment, if an original T to be copied is set on the automatic original feeder (S42) for making a copy thereof, the bin is immediately switched to the copy bin 210. Therefore, at the time when a user depresses a copy key after setting the number of copies and the size of the sheet S, the copy bin 210 takes the position at the paper outlet, and there is substantially no waiting time for a user until the printer bin 220 is replaced by the copy bin 210.

In this manner, also when the basic bin position of the finisher is set at the printer bin 220 like the present embodiment, the waiting time of the image forming device can be reduced.

What is claimed is:

1. An image forming device comprising:
   an image forming main body operative for at least two different functions including a copy function and a printer function, a copy output having an image copied by said copy function and a printer output having an image printed by said printer function being discharged from a same paper outlet; and
   a finisher including a copy bin for receiving said copy output and a printer bin for receiving said printer output, which are selectively set in a position at said paper outlet such that, when said printer bin is in the position at said paper outlet, if an original to be copied is set, or if an automatic original feeder or a platen is raised, said printer bin is replaced by said copy bin without depressing a copy key for performing a copy function.

2. An image forming device according to claim 1 wherein, the position where said original to be copied is set is on an original-setting glass plate or on said automatic original feeder.

3. An image forming device according to claim 1 wherein, when said original to be copied is set while said printer function is not active and said printer bin is in the position at said paper outlet, said printer bin is immediately replaced by said copy bin.

4. An image forming device according to claim 1 wherein, when said original to be copied is set while said printer function is active and said printer bin is in the position at said paper outlet, said printer bin is replaced by said copy bin immediately after completion of said printer function.

5. An image forming device according to claim 1 wherein, when a copy key is depressed while said printer function is active and said printer bin is in the position at said paper outlet, said printer bin is replaced by said copy bin immediately after completion of said printer function, and the copy function is started.

6. An image forming device according to claim 1 wherein, when a predetermined period of time expires after completion of the printer function, said printer bin is replaced by said copy bin.

7. An image forming device according to claim 1 wherein, when a printer signal instructing the printer function is received while the copy function is active and said copy bin is in the position at said paper outlet, said copy bin is replaced by said printer bin immediately after completion of said copy function, and the printer function is started.

8. An image forming device comprising:
   an image forming main body operative for at least two different functions including a copy function and a facsimile function, a copy output having an image copied by said copy function and a facsimile output having an image formed by said facsimile function being discharged from a same paper outlet; and
   a finisher including a copy bin for receiving said copy output and a facsimile bin for receiving said facsimile output, which are selectively set in a position at said paper outlet such that, when said facsimile bin is in the position at said paper outlet, if an original to be copied is set, or if an automatic original feeder or a platen is raised, said facsimile bin is replaced by said copy bin without depressing a copy key for performing a copy function.

9. An image forming device according to claim 8 wherein the position where said original to be copied is set is on an original-setting glass plate or on said automatic original feeder.

10. An image forming device according to claim 8 wherein, when said original to be copied is set while said facsimile function is not active but said facsimile bin is in the position at said paper outlet, said facsimile bin is immediately replaced by said copy bin.

11. An image forming device according to claim 8 wherein, when said original to be copied is set while said facsimile function is active and said facsimile bin is in the position at said paper outlet, said facsimile bin is replaced by said copy bin immediately after completion of said facsimile function.

12. An image forming device according to claim 8 wherein, when a copy key is depressed while said facsimile function is active and said facsimile bin is in the position at said paper outlet, said facsimile bin is replaced by said copy bin immediately after completion of said facsimile function, and the copy function is started.

13. An image forming device according to claim 8 wherein, when a predetermined period of time expires after completion of the facsimile function, said facsimile bin is replaced by said copy bin.

14. An image forming device according to claim 1 wherein, when a facsimile signal instructing a facsimile function is received while a copy function is active and said copy bin is in the position at said paper outlet, said copy bin is replaced by said facsimile bin immediately after completion of said copy function, and the facsimile function is started.

15. An image forming device comprising:
   an image forming main body operative for at least two different functions including a first function and a second function, a first output having an image formed by said first function and a second output having an image formed by said second function being discharged from a same paper outlet; and
   a finisher including a first bin for receiving said first output and a second bin for receiving said second output, which are selectively set in a position at said paper outlet such that, when said second bin is in the position at said paper outlet, if an original to be copied is set, or if an automatic original feeder or a platen is raised, said second bin is replaced by said first bin without depressing a key for performing the first function.

* * * * *